United States Patent [19]
Knop et al.

[11] Patent Number: 5,821,864
[45] Date of Patent: Oct. 13, 1998

[54] WIRELESS INTERFACE PROBE APPARATUS AND METHOD

[75] Inventors: Scott R. Knop, Mason; Randall J. Vorce, Williamston, both of Mich.

[73] Assignee: Enviro Products, Inc., Lansing, Mich.

[21] Appl. No.: 641,026

[22] Filed: Apr. 29, 1996

[51] Int. Cl.$^6$ .................................................. G08B 21/00
[52] U.S. Cl. .......................... 340/622; 340/620; 340/621; 73/49.2 T
[58] Field of Search ..................................... 340/622, 621, 340/620, 605, 854.8, 854.9, 855.1; 73/152.54, 49.2 T; 242/395; 175/40; 166/66; 174/115

[56] References Cited

U.S. PATENT DOCUMENTS

| | | | |
|---|---|---|---|
| 4,123,753 | 10/1978 | Gravert | 340/621 |
| 4,326,199 | 4/1982 | Tarpley et al. | 340/622 |
| 4,590,797 | 5/1986 | Beaubatie et al. | 340/622 |
| 4,818,976 | 4/1989 | Schmitt et al. | 340/622 |
| 4,967,593 | 11/1990 | McQueen | 340/622 |
| 5,043,912 | 8/1991 | Reus | 340/621 |
| 5,284,048 | 2/1994 | Horner | 73/49.2 T |
| 5,514,338 | 5/1996 | Simon et al. | 340/620 |

*Primary Examiner*—Jeffery A. Hofsass
*Assistant Examiner*—John Tweel, Jr.
*Attorney, Agent, or Firm*—Basil E. Demeur; Alan B. Samlan; Robert L. Knechtel

[57] ABSTRACT

A wireless interface probe having a transmitter, a signal transport/measuring device, and a receiver as provided. The transmitter has two sensors: a liquid level sensor and a water level sensor. The liquid level sensor determines the boundary between gaseous and liquid media. The water level sensor detects the presence of conductive liquid such as water. Signals generated by the transmitter sensors are transported inductively to the receiver via the signal transport/measuring device. The signal transport/measuring device is a standard metallic measuring tape which affixes to the transmitter via metallic fasteners. The receiver decodes the signals generated by the transmitter and creates an audio and visual reading output. The output reading indicates to the operator the level of the free-phase hydrocarbons and the level of the water. The difference between the two levels is the thickness of the hydrocarbons, which can be determined by using the measuring tape.

21 Claims, 2 Drawing Sheets

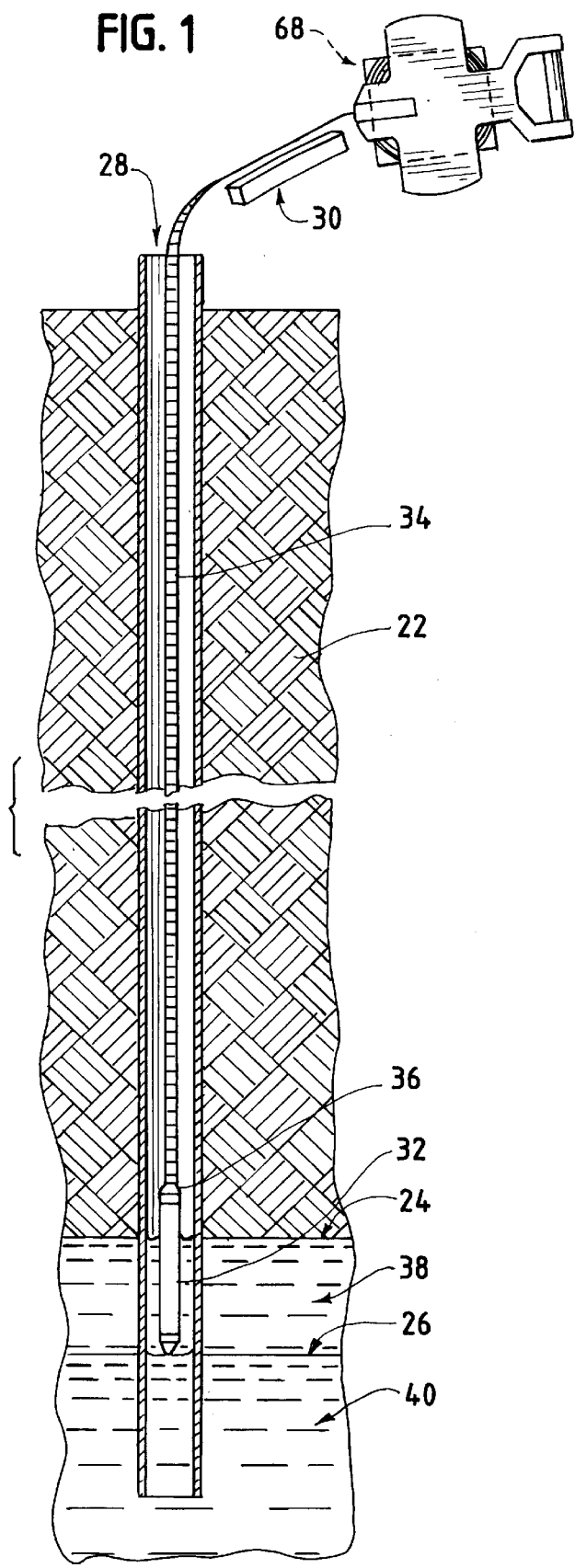
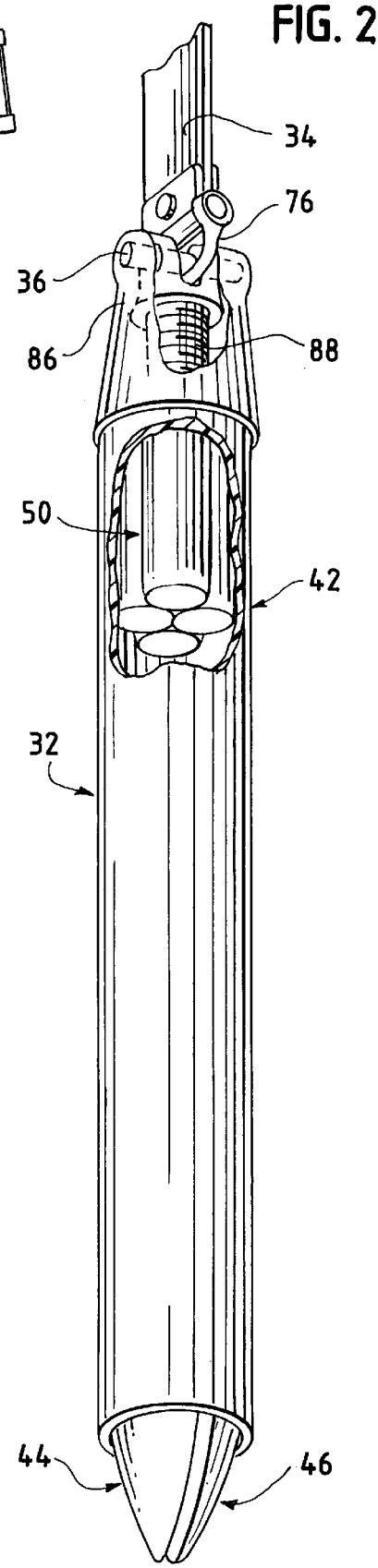
FIG. 1
FIG. 2

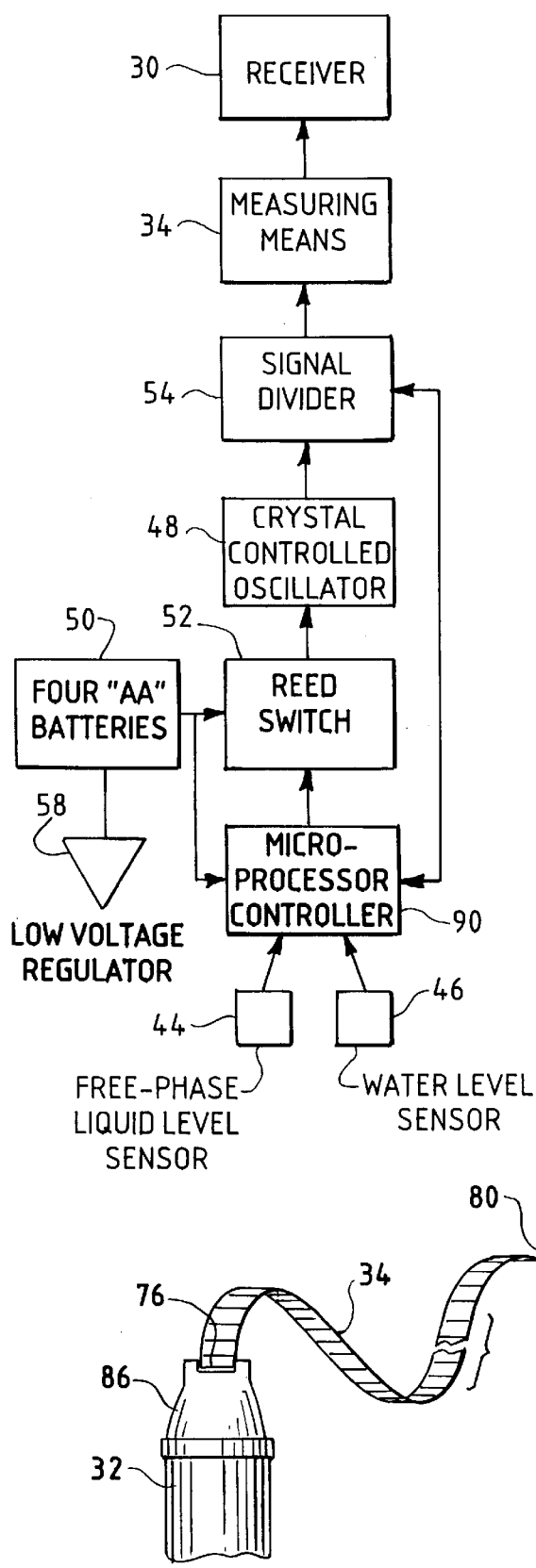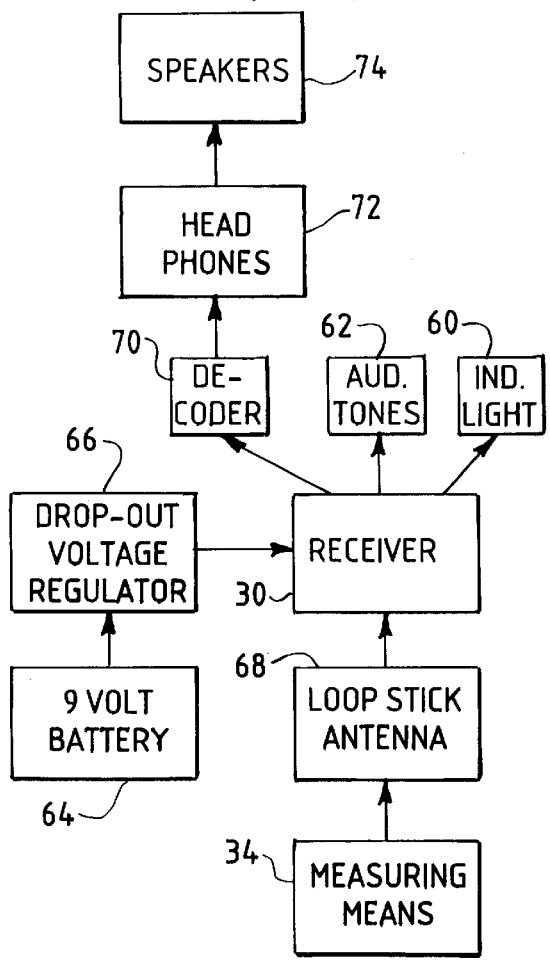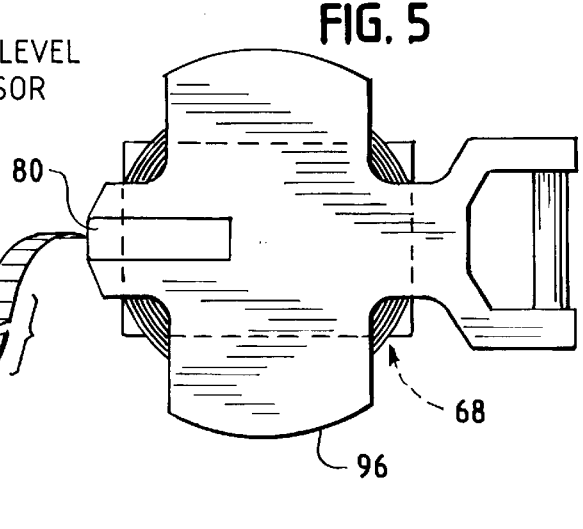

WIRELESS INTERFACE PROBE APPARATUS AND METHOD

I. TECHNICAL FIELD

This invention relates generally to an interface probe for the detection and measurement of water levels, water-free-phase hydrocarbon interface levels, and the depth of free-phase hydrocarbon in well water. More particularly, the invention relates to an interface probe which utilizes a standard metallic measuring tape to inductively transfer data collected by a transmitter to a receiver, and a self-heated thermal sensor and a conductivity sensor to distinguish between water and hydrocarbon and determine their levels.

II. BACKGROUND OF INVENTION

Petrochemical contamination of well water is of general concern to everyone. It is well known in the groundwater industry that measurement of the level of petrochemical, also called free-phase hydrocarbon, contamination found in water wells is important inasmuch as increased levels of hydrocarbon may render the water unsuitable for use, thereby requiring clean-up.

Several attempts have been made to address the problem of accurately measuring water levels and/or free-phase hydrocarbon levels. To date, the prior art has generally relied upon conductive wires to transmit data obtained by a transmitter to a receiver. One such example is found in U.S. Pat. No. 4,123,753 to Gravert. This Patent discloses an ullage measuring device designed to detect the depth of a liquid within a tank.

The device utilizes a composite measuring tape to connect a transmitter and a hand-held sensing unit, and to transmit collected data. The composite tape has a pair of electrically conductive wires contained within it. Once the transmitter comes in contact with a liquid, a signal is transmitted to the receiver via the conductive wires.

Another example is found in U.S. Pat. No. 5,140,318 to Steiner which discloses a data transmission system utilizing a cable covered with a jacket to conductively transmit data to a transmitter and receiver located in a truck.

The accuracy of conductive technology is dependent on the quality of the conductive wires. Also, the electrically conductive wires break easily resulting in malfunction of the equipment. Due to the complexity of the equipment, replacement must be done at the factory and is expensive. Finally, the sensors for these devices require cleaning after each use to rid the sensors of residue.

There is need, therefore, for a water and free-phase hydrocarbon interface probe which utilizes induction to transmit data from transmitter to receiver. Further, there is need for an interface probe which utilizes a standard metallic measuring tape to transmit the inductive signal. Further, there is need for an interface probe wherein the transmitting medium, i.e, standard metallic measuring tape, can be easily replaced in the field. Further, there is need for an interface probe which accurately measures the water-free-phase hydrocarbon levels and interface in a wide range of temperatures. These needs are addressed in the present invention.

IV. OBJECTS OF THE INVENTION

An object of the present invention is to provide a water-free-phase hydrocarbon interface probe.

Another object of the present invention is to provide a water-free-phase hydrocarbon interface probe which utilizes wireless technology to transmit data between the transmitter and receiver.

Another object of the present invention is to provide a wireless interface probe utilizing a standard metallic measuring tape for connecting the transmitter and receiver, and for inductively transmitting signals from the transmitter to the receiver.

Another object of the present invention is to provide an interface probe having a self-heated thermal sensor that detects the boundary between gaseous and liquid media.

Another object of the present invention is to provide an interface probe having circuitry to determine if a liquid is conductive.

Another object of the present invention is to provide an interface probe wherein use of the self-heated thermal sensor and conductivity circuit in tandem results in the accurate measurement of the water-hydrocarbon interface.

Another object of the present invention is to provide a wireless interface probe having low maintenance sensors, and which is portable, battery operated and easy to use.

V. INVENTION SUMMARY

The above objects of the present invention are provided in a wireless interface probe. The probe consists of a transmitter, a signal transport /measuring means, and a receiver. The transmitter has two sensors: a liquid level sensor and a water level sensor. The liquid level sensor determines the boundary between gaseous and liquid media. The water level sensor detects the presence of conductive liquids, i.e., water. Signals generated by the transmitter sensors are transported inductively to the receiver via the signal transport/measuring means. The signal transport/measuring means is a standard metallic measuring tape which affixes to the transmitter via metallic fastening means.

The receiver decodes the signals generated by the transmitter and creates both an audio and visual reading output for the operator. The output reading indicates to the operator the level of the free-phase hydrocarbons and the level of the water. The difference between the two levels is the thickness of the hydrocarbons, which thickness can be determined using the measuring tape.

VI. BRIEF DESCRIPTION OF THE DRAWINGS

FIG. 1 depicts a cutaway view of a well showing the Device lowered into it.

FIG. 2 depicts the Transmitter Probe.

FIG. 3 is a block diagram of the Transmitter Probe circuitry.

FIG. 4 is a block diagram of the Receiver circuitry.

FIG. 5 depicts the signal transport/measuring means.

VII. DETAILED DESCRIPTION OF THE PREFERRED EMBODIMENT

Referring to FIG. 1, a well 20 having free-phase hydrocarbon 38 floating on groundwater 40 is shown. The hydrocarbon 38 has a surface level 24 to be detected and a water-free-phase hydrocarbon interface 26 depth to be measured. Also shown is the inventive device consisting of a hand held receiver 30, a transmitter probe 32, and a signal transport/measuring means (measuring means) 34.

Referring to FIG. 2, the transmitting probe 32 is contained within a water-tight housing 42 and equipped with an industry standard meeting free-phase liquid level sensor means 44 and a water level sensor s 46. The liquid level sensor means 44 detects the boundary between a gaseous and liquid medium. The liquid level sensor means 44 utilizes a self-heated thermistor that is capable of sensing the difference in thermal conductivity between gases and liquids independent of their composition.

The liquid sensor means 44 activates the transmitter circuitry when liquid of any kind is detected, and causes a pulsed signal output. The liquid sensor means 44 is most accurate in temperature less than 80° F. and preferably less than 65° F. but greater than 20° F. The accuracy at the sensor in temperatures greater than 80° F. is affected. It is the inventor's experience, however, that groundwater temperatures of greater than 65° F. are rarely encountered.

The water level sensor 46 has a conductivity circuit that detects the presence of conductive liquids, i.e. water.

Referring to FIG. 3, the transmitter probe 32 contains a microprocessor controller 90 which monitors the transmitter probe's circuitry and registers when the liquid sensor means 44 and water sensor means 46 contact a designated liquid. The controllers system clock is produced by a crystal controlled oscillator 48 operating at 4.9152 MHZ. This system clock is also divided by four to produce the 1.2288 MHZ carrier wave of the transmitter. The transmitter probe 32 obtains the 1.2288 MHZ signal from the divider 54 and under control of a microprocessor, couples the signal to the measuring means 34.

The microprocessor uses time division multiplexing to generate a discrete audio frequency to apply the sensor status and low battery alarm information on the 1.2288 MHZ carrier wave. This form of transmission is classified as amplitude modulated carrier wave.

The method of transmitting signals from the transmitter probe 32 to the receiver 30 is accomplished inductively via the measuring means 34. The probe sensors 44 and 46 are connected to the end cap 86 of the probe 32 by means of a wire contained internally within the probe structure. When the probe sensors detect the presence of the appropriate conductive liquid, the signal energizes the end cap 86, which signal then travels along the measuring means 34 inductively. The electronic wave is then picked up by the loop antenna 55 of the receiver 30. In this manner, the electromagnetic wave is transferred via the measuring means 34 to the receiver 30.

The controller's power is supplied through a magnetically operated reed switch 52 by four "AA"(6 volt) batteries 50. Both Alkaline and rechargeable batteries can be used to operate the Transmitter Probe. The reed switch 52 applies power to the probe whenever it is removed from its carrying case which contains a permanent magnet that activates the switch. This eliminates the need to incorporate a manual power switch. The battery power is then pre-conditioned by a low voltage regulator 58 that supplies a highly stable 5.0 VDC to the probe support circuitry and the microprocessor chip. It also provides low battery information to the microprocessor so that when the battery voltage drops below 5.25 volts, the transmitter probe sends a low battery alarm signal to the receiver to alert the operator. The transmitter probe 32 can accurately measure the level of non-conductive petrochemical contamination floating on conductive groundwater in wells up to 50 meters in depth. Due to the size of the transmitter probe, it must be used in wells measuring 2" in diameter or greater, although the inventors contemplate a small transmitter probe as sensing technology advances.

Referring to FIG. 4, the receiver 30 detects the signals sent by the transmitter probe via the signal transport/measuring means 34. The receiver decodes and displays the information in the form of indicator lights 60 and audible tones 62. Power is supplied by a single 9 volt alkaline battery 64 through a control switch on the enclosure. As with the transmitter prober, both alkaline and rechargeable batteries can be used. Battery power is pre-conditioned by a low drop-out voltage regulator circuit similar to that described for the probe. This circuit also lights a low battery indicator when the voltage drops below 5.25 VDC.

The inductive transmitter probe signal present on the measuring means 34 is picked up by a loop stick antenna 55 on the radio module. The radio module converts the signals into audio and passes them to the tone decoder circuit 70 and also amplifies and sends them to the unit speakers 74 and headphone jack 72. The tone decoder circuit 70 lights the indicator light 62 associated with the particular audio tone being received. For example, low tone indicates non-conductive liquid, high tone indicates conductive water, and medium tone indicates low battery condition in the sensor.

Referring to FIG. 5, the signal transport/measuring means 34 comprises a standard metallic measuring tape coupled to the transmitter probe 32 by means of metallic hardware 76. Any metallic measuring tape such as those produced and sold under the trademark "Lufkin"® can be used in the Device.

The measuring tape does not have to be coated with a non-conductive material, such as nylon, unless it is to be used in the metallic well. However, the transmitter probe 32 produces electromagnetic waves in the measuring means 34 through its entire length. A nylon coated tape keeps the radio energy from being absorbed by the surrounding grounded well pipe.

As indicated, power is supplied by a single 9 volt Alkaline battery through a control switch on the enclosure. The battery power is pre-conditioned by low drop-out voltage regulator circuit similar to that described for the probe. This circuit also lights a low battery indicator when the battery voltage drops below 6.25 VDC. The output of the voltage regulator is controlled by an auto shut-down circuit. It is designed to shut down the regulator in the event that the power switch is left on for extended periods with no activity on the indicator lights, such as leaving the power switch on when storing the unit in its case. The probe signal present on the tape is picked up by a loop stick antenna 55 on the radio module 80. The radio module 80 converts the signals to audio and passes them to the tone decoder circuit and also amplifies and sends them to the unit speaker and headphone jack. The audio amplifier on the radio module is controlled by a volume control pod on the receiver case. The tone decoder circuit is designed to light the indicator light associated with the particular audio tone being received. For example, a low tone indicates non-conductive liquid encountered, high tone indicates conductive water encountered, whereas medium tone would indicate low battery condition in the sensor.

To replace the measuring means 34, disconnect the old measuring means from the hook mechanism 86 by removing from metallic hardware 76 and tape reel 96 and replace it with a new one. This can be accomplished quickly and in the field.

Referring back to FIG. 1, the apparatus is used by lowering the transmitter probe 32 into the well shaft opening 28 until a liquid is encountered. If water is encountered a high audible tone will be generated. The transmitter probe is then raised until the tone is no longer heard. The transmitter probe is then again slowly lowered until the tone is once again heard. At this point, a measurement can be taken from the measuring means 34 at the top of the well 20.

If "free product" is encountered, a low level tone will be generated. The transmitter probe should then be raised until the tone is no longer heard. The transmitter probe should then once again be lowered into the free-phase hydrocarbon 38 until the tone is heard. This represents the top of the "free product" 24 and a measurement should be taken from the measuring tape 34. The transmitter probe should then be lowered until a high tone is generated. This represents the level of the water-free-phase hydrocarbon interface 26. A measurement should be taken at this level. The difference between the interface level and the top of the free-phase hydrocarbon is the depth of the free-phase hydrocarbon. It is important to raise and lower the transmitter probe in small increments to obtain an accurate reading.

We claim:

1. An interface probe for the detection and measurement of water levels, water-free-phase hydrocarbon interface, and depth of free-phase hydrocarbon floating on ground water comprising, a transmitter probe housed within a water type casing, said transmitter probe including a liquid sensing means formed by a self-heating thermistor which detects the boundary of gases and liquids by sensing thermal conductivity differences, a water sensing means formed by a conductivity circuit which detects the presence of conductive liquids, an inductive signal generating means for transmitting signals from the transmitter probe and having a sensor end and a distal hook end, a signal transport/measuring means for transmitting inductive signals generated by the transmitter probe and having incremental markings for measuring water levels, water-free-phase hydrocarbon interface and free-phase hydrocarbon depth, and having a connecting end and a receiver approximating end, and a receiver means for receiving, decoding and displaying data and having a signal transport/measuring means approximating end, whereby the connecting end of the signal transport measuring means is affixed to the transmitter probe hook end and at the predetermined distance held in contact with the signal transport/measuring means approximating end of the receiver means, the transmitter probe being lowered into a well and upon detection of a liquid by the liquid sensor means or the water sensor means generates an inductive signal which is transmitted to the receiver means via the signal transport/measuring means.

2. The apparatus of claim 1 wherein the inductive signal generating means is an amplitude modulated carrier wave produced by an oscillator having a divider which produces the transmission wave.

3. The apparatus of claim 2 wherein said oscillator operates at 4.9152 MHz and is divided by 4 to produce the carrier wave.

4. The apparatus of claim 1 wherein the transmitter probe includes an end cap and said liquid sensing and water sensing means are directly wired to said end cap whereby an appropriate signal picked up by said sensing means energizes said end cap and said signal is then inductively transmitted along said measuring means to said receiver means.

5. The apparatus of claim 1 wherein the signal transport/measuring means is a metallic tape.

6. The apparatus of claim 4 further comprising a non-conductive coating to keep radio energy from being absorbed by surrounding grounded well pipe.

7. The apparatus of claim 6 wherein the non-conductive coating is nylon.

8. The apparatus of claim 1 and further comprising a conversion means at its approximating end for absorbing the carrier waves electromagnetic energy and converts it to electrical signals which are transferred to the receiver means.

9. The apparatus of claim 1 wherein the receiver means includes a loop stick antenna which picks up the electrical signals transferred to it by the conversion means, and means to convert the signals into audio and visual displays.

10. The apparatus of claim 1 wherein the transmitter includes a magnetically operated read switch which is activated when the transmitter is removed from a carrying case containing a permanent magnet installed, thereby activating the transmitter probe.

11. The apparatus of claim 1 wherein the transmitter and receiver means are battery operated.

12. An interface probe for the detection and measurement of water levels, water-free-phase hydrocarbon interface and depth of free-phase hydrocarbon floating on ground water comprising, a transmitter probe housed within a water-tight casing, a liquid sensing means for detecting liquid levels utilizing a self-heating thermistor, a water sensing means for detecting levels of conductive liquids utilizing a conductivity circuit, an inductive signal generating means for transmitting signals from the transmitter probe, an end cap electrically connected to said liquid sensing means and water sensing means, a hook means, a signal transport/measuring means for transmitting inductive signals generated by the transmitter probe and for measuring water levels, water-free-phase hydrocarbon interface and free-phase hydrocarbon depth comprising, a metal tape having incremental markings, a reel end having a conversion means for converting a carrier wave electromagnetic signal into electrical signals, a connecting end for attachment to the transmitter probe, a receiver means for receiving, decoding and displaying data formed by a loop stick antenna which picks up the electrical signals from the signal transport/measuring means, and means to convert the electrical signals into audio and visual displays, whereby the connecting end of the signal transport/measuring means is affixed to the transmitter probe hook means and at a predetermined distance held in contact with the receiver means near the loop antenna, the transmitter probe being lowered into a well and upon detection of a liquid by the liquid sensor means or the water sensor means generates an inductive signal which is transmitted to the receiver means via the signal transport/measuring means.

13. The apparatus of claim 12 wherein the liquid sensor detects the boundary of gases and liquids by sensing thermal conductivity differences.

14. The apparatus of claim 12 wherein the inductive signal generating means is an amplitude modulated carrier wave produced by an oscillator having a divider which produces the transmission wave.

15. The apparatus of claim 14 wherein the oscillator operates at 4.9152 MHZ and is divided by four to produce the carrier wave.

16. The apparatus of claim 12 wherein the transmitter probe includes an end cap directly wired to said sensing means whereby a signal picked up by said sensing means energizes said end cap such that said signal is inductively transmitted along said signal transport/measuring means to said receiver.

17. The apparatus of claim 12 and further comprising a non-conductive coating to keep radio energy from being absorbed by surrounding grounded well pipe.

18. The apparatus of claim 17 wherein the non-conductive coating is nylon.

19. The apparatus of claim 12 wherein the transmitter probe includes a magnetically operated reed switch which is activated when the transmitter is removed from a carrying case containing a permanent magnet installed, thereby activating the transmitter probe.

20. The apparatus of claim 1 wherein the transmitter and receiver means are battery operated.

21. A method for detecting and measuring the water level, water-free-phase hydrocarbon interface, and free-phase hydrocarbon depth in ground water comprising the steps of:

lowering a transmitter probe which is affixed to a signal transport/measuring means connecting end into a well of at least two inches in diameter until a signal is transmitted by the transmitter probe to a receiver approximated to the signal transport/measuring means coil end, determining whether the signal indicates water or free-phase hydrocarbon, if water is indicated, raising the transmitter probe until a signal is no longer transmitted, followed by slowly lowering the transmitter probe once again until a signal is transmitted, taking a measurement on the signal transport/measuring means at the well opening to determine a water level, if free-phase hydrocarbon is indicated, raising the transmitter probe until a signal is no longer transmitted, followed by slowly lowering the transmitter probe once again until a signal is transmitted, taking a measurement on the signal transport/measuring means at the well opening to determine a free-phase hydrocarbon level, followed by lowering the transmitter probe through the hydrocarbon until a signal indicating water is transmitted and taking a further measurement on the signal transport/measuring means at its end at the well opening to determine the water-free-phase hydrocarbon interface level, calculating the difference between the free-phase hydrocarbon level and the water-free-phase hydrocarbon interface level to determine the depth of the free-phase hydrocarbon.

* * * * *